United States Patent
Kosaka (10) Patent No.: US 11,505,271 B2
(45) Date of Patent: Nov. 22, 2022

(54) OPERATING DEVICE

(71) Applicant: Shimano Inc., Osaka (JP)

(72) Inventor: Kentaro Kosaka, Osaka (JP)

(73) Assignee: Shimano Inc., Osaka (JP)

( * ) Notice: Subject to any disclaimer, the term of this patent is extended or adjusted under 35 U.S.C. 154(b) by 272 days.

(21) Appl. No.: 16/884,811

(22) Filed: May 27, 2020

(65) Prior Publication Data

US 2021/0371035 A1    Dec. 2, 2021

(51) Int. Cl.
| | | |
|---|---|---|
| *H01H 21/12* | (2006.01) | |
| *H01H 21/22* | (2006.01) | |
| *B62J 45/00* | (2020.01) | |

(52) U.S. Cl.
CPC .............. *B62J 45/00* (2020.02); *H01H 21/12* (2013.01); *H01H 21/22* (2013.01)

(58) Field of Classification Search
CPC ..... B62J 45/00; B62J 45/20; H01H 2009/068; H01H 23/003; H01H 21/22; H01H 21/12; H01H 2239/076; H01H 21/10; B62L 3/023; B62K 23/06
See application file for complete search history.

(56) References Cited

U.S. PATENT DOCUMENTS

| | | | |
|---|---|---|---|
| 8,035,046 B2 * | 10/2011 | Perini | B62M 25/08 |
| | | | 74/473.12 |
| 8,955,863 B2 | 2/2015 | Kosaka et al. | |
| 9,145,183 B2 | 9/2015 | Kosaka et al. | |
| 9,394,031 B2 | 7/2016 | Oku et al. | |
| 9,711,304 B2 * | 7/2017 | Rosati | B62M 25/08 |
| 10,370,056 B2 | 8/2019 | Komatsu et al. | |
| 2006/0162479 A1 | 7/2006 | Irie | |
| 2007/0034037 A1 | 2/2007 | Dal Pra et al. | |
| 2011/0320093 A1 * | 12/2011 | Kitamura | B62M 25/08 |
| | | | 701/1 |
| 2014/0058578 A1 * | 2/2014 | Tetsu | B62K 23/06 |
| | | | 701/1 |
| 2014/0090967 A1 * | 4/2014 | Inagaki | H01H 13/14 |
| | | | 200/513 |

* cited by examiner

*Primary Examiner* — Edwin A. Leon
(74) *Attorney, Agent, or Firm* — Global IP Counselors, LLP (57) ABSTRACT

An operating device is provided for a human-powered vehicle. The operating device basically includes a base, a first operating member and a first electric switch. The first operating member is movably arranged with respect to the base from a first position to a second position. The first electric switch is provided to the base. The first operating member is configured to activate the first electric switch at least two distinct times in response to a progressive movement of the first operating member from the first position towards the second position.

20 Claims, 10 Drawing Sheets

OPERATING DEVICE

BACKGROUND

Technical Field

This disclosure generally relates to an operating device. More specifically, the present disclosure relates to an operating device for operating a component of a human-powered vehicle.

Background Information

Generally, human-powered vehicles (e.g., bicycles) are typically provided with one or more operating devices for operating one or more components. These operating devices include an operating member that operates one or more the other components. Thus, the operating device is usually provided in a convenient place (e.g., on a bicycle handlebar) for a user to operate the operating device. In more recent years, some operating devices are provided with one or more switches that are activated by moving the operating member which in turn sends a control signal to operate a component. The switch or switches can send control signals either wirelessly or via an electrical wire. One example of an operating device for a human-powered vehicle (e.g., bicycle) is disclosed in in U.S. Pat. No. 9,145,183.

SUMMARY

Generally, the present disclosure is directed to various features of an operating device for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, an operating device is provided for a human-powered vehicle. The operating device basically comprises a base, a first operating member and a first electric switch. The first operating member is movably arranged with respect to the base from a first position to a second position. The first electric switch is provided to the base. The first operating member is configured to activate the first electric switch at least two distinct times in response to a progressive movement of the first operating member from the first position towards the second position.

With the operating device according to the first aspect, it is possible to output two control signals from the first electric switch in a single operation of the first operating member.

In accordance with a second aspect of the present disclosure, the operating device according to the first aspect is configured so that the first operating member is further configured to activate the first electric switch only once in response to the progressive movement of the first operating member from the first position towards an intermediate position that is along a travel path of the first operating member between the first position and the second position.

With the operating device according to the second aspect, it is possible to selectively output one or two control signals from the first electric switch in a single operation of the first operating member.

In accordance with a third aspect of the present disclosure, the operating device according to the first or second aspect further comprises a first electricity-generating element coupled to the first electric switch to generate electricity upon activation of the first electric switch.

With the operating device according to the third aspect, it is possible to omit the need for a battery by generating electricity in response to activation of the first electric switch.

In accordance with a fourth aspect of the present disclosure, the operating device according to any one of the first to third aspects further comprises an output part movably coupled to the base. The first operating member includes a first operating body and a reciprocating mechanism connecting the first operating body to the output part such that the output part is repeatedly moved in response to the progressive movement of the first operating member from the first position towards the second position.

With the operating device according to the fourth aspect, it is possible to reliably activate the first electric switch to output two control signals in response to the progressive movement of the first operating member from the first position towards the second position.

In accordance with a fifth aspect of the present disclosure, the operating device according to the fourth aspect is configured so that the first operating body is pivotally arranged with respect to the base around a first pivot axis, and the output part includes a rocker pivotally arranged with respect to the base around a second pivot axis that is offset from the first pivot axis.

With the operating device according to the fifth aspect, it is possible to provide a simple construction for performing a multiple activation of the first electric switch.

In accordance with a sixth aspect of the present disclosure, the operating device according to the fourth or fifth aspect is configured so that the reciprocating mechanism includes a cam provided to the first operating body, and a follower provided to the output part, and the cam contacts and moves the follower to move the output part such that the output part activates the first electric switch in response to the progressive movement of the first operating member from the first position towards the second position.

With the operating device according to the sixth aspect, it is possible to provide a simple construction for selectively performing either a single activation of the first electric switch or a multiple activation of the first electric switch.

In accordance with a seventh aspect of the present disclosure, the operating device according to any one of the fourth to sixth aspects is configured so that the follower is pivotally provided on the output part, and at least one of the cam and the follower is biased to the other of the cam and the follower so as to be in contact with the one another.

With the operating device according to the seventh aspect, it is possible to reliably provide contact between the cam and the follower as the first operating member is operated.

In accordance with an eighth aspect of the present disclosure, the operating device according to any one of the fourth to seventh aspects is configured so that the follower is pivotally provided on the output part, and the first operating member includes a limiting structure configured to limit a pivotal movement range of the follower with respect to the output part.

With the operating device according to the eighth aspect, it is possible to limit the pivotal movement of the follower as the first operating member is operated.

In accordance with a ninth aspect of the present disclosure, the operating device according to the eighth aspect is configured so that the limiting structure includes a protrusion provided to one of the output part and the follower, and a recess provided to the other of the output part and the follower.

With the operating device according to the ninth aspect, it is possible to provide a simple construction for limiting the pivotal movement of the follower as the first operating member is operated.

In accordance with a tenth aspect of the present disclosure, the operating device according to any one of the fourth to ninth aspects is configured so that the output part is biased away from the first electric switch.

With the operating device according to the tenth aspect, it is possible to advertently activate the first electric switch by the output part.

In accordance with an eleventh aspect of the present disclosure, the operating device according to any one of the first to tenth aspects further comprises a second operating member movably arranged with respect to the base, the second operating member being a separate member from the first operating member.

With the operating device according to the eleventh aspect, it is possible to independently operate each of the first operating member and the second operating member.

In accordance with a twelfth aspect of the present disclosure, the operating device according to the eleventh aspect is configured so that the second operating member is configured to be free from activating the first electric switch in response to a progressive movement of the second operating member.

With the operating device according to the twelfth aspect, it is possible to operate the second operating member without outputting a control signal from the first electric switch.

In accordance with a thirteenth aspect of the present disclosure, the operating device according to the eleventh or twelfth aspect further comprises a second electric switch activated in response to a progressive movement of the second operating member.

With the operating device according to the thirteenth aspect, it is possible to output a control signal from the second electric switch in response to a progressive movement of the second operating member.

In accordance with a fourteenth aspect of the present disclosure, the operating device according to the thirteenth aspect further comprises a second electricity-generating element coupled to the second electric switch to generate electricity upon activation of the second electric switch.

With the operating device according to the fourteenth aspect, it is possible to omit the need for a battery by generating electricity in response to activation of the second electric switch.

In accordance with a fifteenth aspect of the present disclosure, the operating device according to the thirteenth or fourteenth aspect is configured so that the second operating member is biased away from the second electric switch.

With the operating device according to the fifteenth aspect, it is possible to advertently activate the second electric switch by the second operating member.

In accordance with a sixteenth aspect of the present disclosure, the operating device according to any one of the eleventh to fifteenth aspects is configured so that the first operating member and the second operating member are pivotally mounted to the base.

With the operating device according to the sixteenth aspect, it is possible to simply operate the first operating member and the second operating member.

In accordance with a seventeenth aspect of the present disclosure, the operating device according to the sixteenth aspect is configured so that the first operating member and the second operating member are coaxially mounted to the base.

With the operating device according to the seventeenth aspect, it is possible to simplify construction of the mounting of the first operating member and the second operating member to the base.

In accordance with an eighteenth aspect of the present disclosure, the operating device according to any one of the first to seventeenth aspects further comprises a handlebar clamp coupled to the base.

With the operating device according to the eighteenth aspect, it is possible to easily operate the first operating member and the second operating member from a handlebar.

In accordance with a nineteenth aspect of the present disclosure, the operating device according to the eighteenth aspect is configured so that the handlebar clamp is configured to be detachable and attachable with respect to the base.

With the operating device according to the nineteenth aspect, it is possible to easily remove the operating device from the handlebar clamp.

In accordance with a twentieth aspect of the present disclosure, the operating device according to any one of the first to nineteenth aspects further comprises a wireless communicator coupled to the first electric switch.

With the operating device according to the twentieth aspect, it is possible for the first electric switch to communicate with other components without the need of connecting wires.

Also, other objects, features, aspects and advantages of the disclosed operating device will become apparent to those skilled in the art from the following detailed description, which, taken in conjunction with the annexed drawings, discloses preferred embodiments of the operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
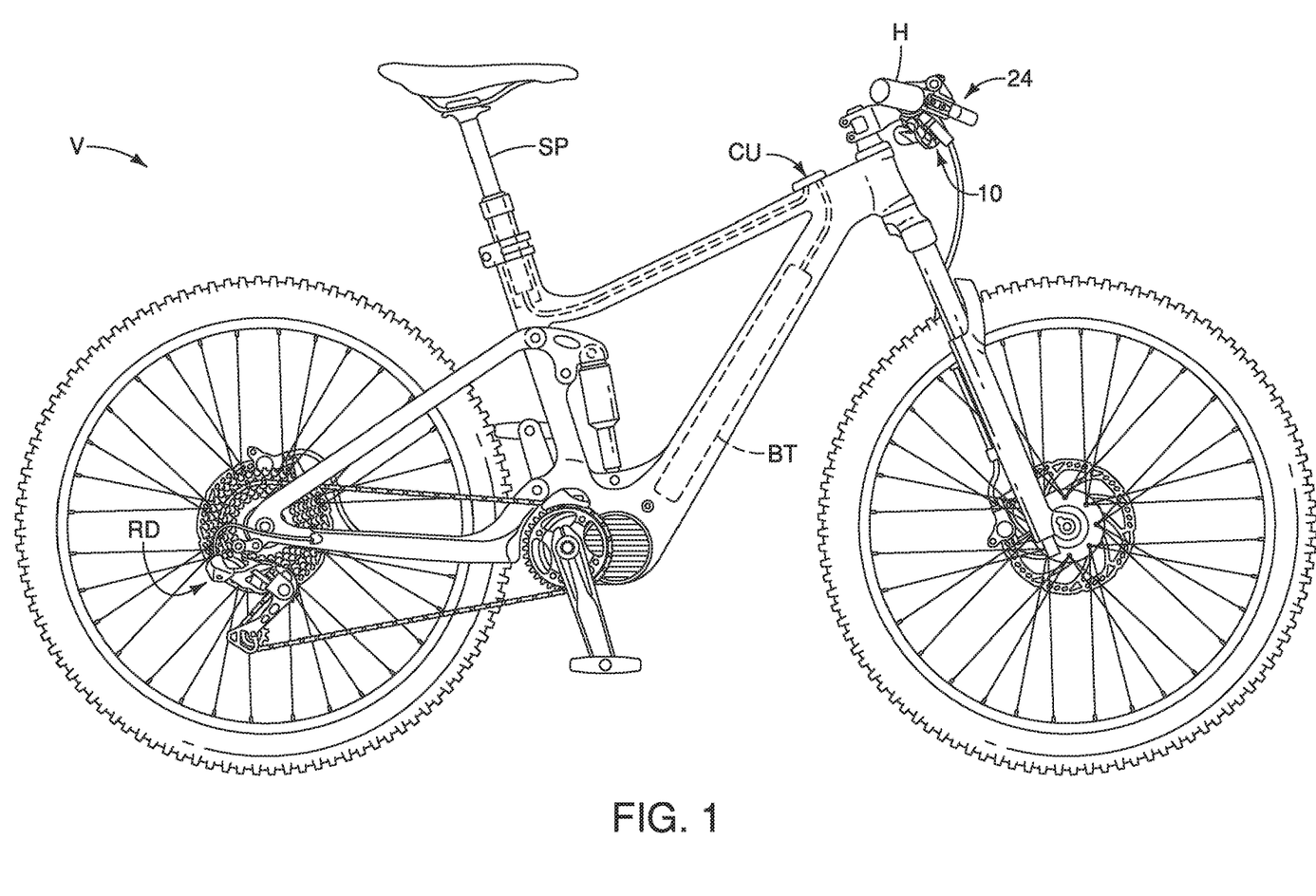
FIG. 1 is a side elevational view of a human-powered vehicle including an operating device for a human-powered vehicle in accordance with one illustrated embodiment.

Referring initially to FIG. 1, an operating device 10 is provided for a human-powered vehicle V in accordance with one illustrated embodiment. Here, in the illustrated embodiment, the operating device 10 is an electric operating device that is provided to the human-powered vehicle V for operating at least one vehicle component in response to a user input. The human-powered vehicle V is an electric assist bicycle (E-bike).

Figure 2:
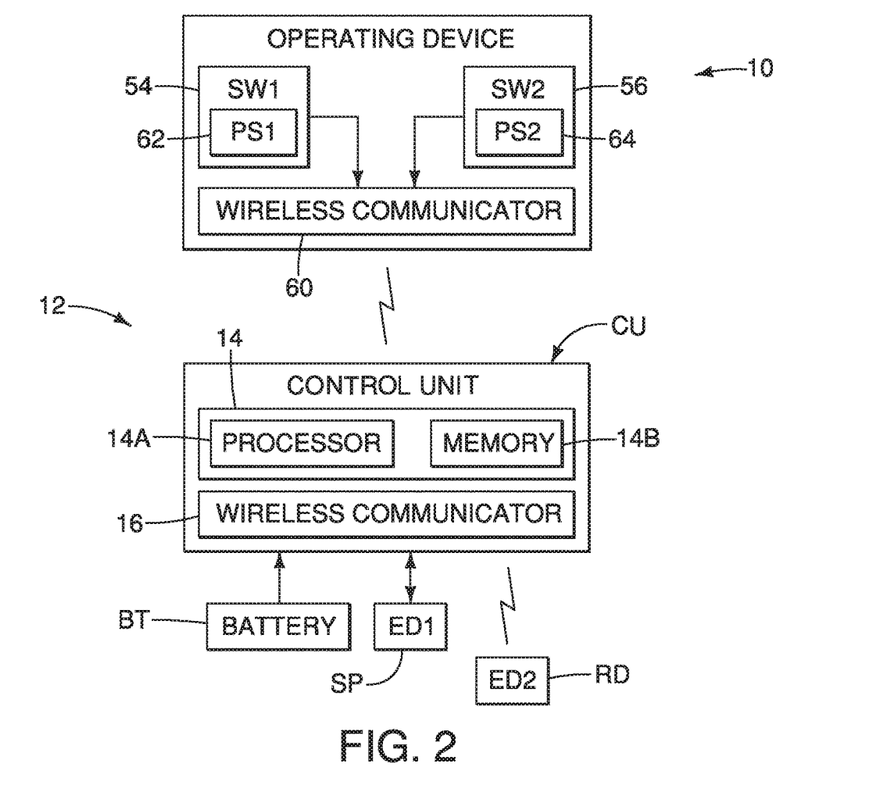
FIG. 2 is a block diagram showing a control system that includes the operating device of the human-powered vehicle illustrated in FIG. 1.

Referring now to FIG. 2, the operating device 10 is part of a control system 12 of the human-powered vehicle V. Since the operating device 10 is used by a rider to operate one or more components of the human-powered vehicle V, the operating device 10 can also be referred to as a user operable input device. Here, in addition to the operating device 10, the control system 12 further includes a control unit CU, the battery BT and one or more electric operated devices ED1 and ED2. Although, the control system 12 is illustrated with two electric operated devices ED1 and ED2, it will be apparent from this disclosure that the control system 12 is not limited to having two electric operated devices. Rather, it will be apparent from this disclosure that the control system 12 can have only one electric operated device, or two or more electric operated device that are operated by the operating device 10. Here, the operating device 10 is configured to wirelessly communicate control signals with the control unit CU to operate one or both of the electric operated devices ED1 and ED2. Alternatively, the operating device 10 can be connected to the control unit CU by an electrical wire to communicate control signals with the control unit CU via the electrical wire.

Here, the electric operated device ED1 is illustrated as communicating with the control unit CU using wired communications, while the electric operated device ED2 is illustrated as communicating with the control unit CU using wireless communications. It will be apparent from this disclosure that the control system 12 that the electric operated devices ED1 and ED2 can be configured to communicate with the control unit CU using either wired communications or wireless communications. Here, for example, the electric operated device ED1 can be an electric adjustable seatpost SP, and the electric operated device ED2 can be the electric rear derailleur RD.

Here, in the illustrated embodiments, the control unit CU includes an electronic controller 14. The electronic controller 14 is formed of one or more semiconductor chips that are mounted on a circuit board. The term "electronic controller" as used herein refers to hardware that executes a software program, and does not include a human. The electronic controller 14 communicates with the operating device 10 such that output signals from the operating device 10 are received by the electronic controller 14 as needed and/or desired. The electronic controller 14 can communicate with the operating device 10 by a wireless connection or by a wired connection. For example, here, the electronic controller 14 wirelessly communicates with the operating device 10. In the case of a wireless connection, the operating device 10 can be provided with a battery or an electric generating-element (e.g., a piezoelectric element, etc.) as explained below. The electronic controller 14 is configured to control the electric operated devices ED1 and ED2 in response to inputs from either the operating device 10, other operating devices and/or other sensors that indicate a particular riding condition. While the electronic controller 14 is illustrated as part of the control unit CU, it will be apparent from this disclosure that the electronic controller 14 can be provided to the operating device 10.

In any case, the electronic controller 14 preferably a microcomputer that includes at least one processor 14A (i.e., a central processing unit) and at least one memory 14B (i.e., a computer storage device). The processor 14A can be one or more integrated circuits having firmware for causing the circuitry to complete the activities described herein. The memory 14B is any computer storage device or any non-transitory computer-readable medium with the sole exception of a transitory, propagating signal. For example, the memory 14B can include nonvolatile memory and volatile memory, and can includes a ROM (Read Only Memory) device, a RAM (Random Access Memory) device, a hard disk, a flash drive, etc.

Also, here, in the illustrated embodiments, the control unit CU includes a wireless communicator 16. The wireless communicator 16 wirelessly communicates with the operating device 10 such that output signals from the operating device 10 are received by the wireless communicator 16 and transmitted to the electronic controller 14. Also, the wireless communicator 16 is configured to wirelessly transmit control signals to electric operated devices such as the electric operated device ED2 in response to operation of the operating device 10. The wireless communication signals of the wireless communicator 16 can be radio frequency (RF) signals, ultra-wide band communication signals, or Bluetooth® communications or any other type of signal suitable for short range wireless communications as understood in the bicycle field. Here, the wireless communicator 16 can be a one-way wireless communication device such as a receiver, or a two-way wireless communication device such as a transceiver.

Referring now to FIGS. 3 to 10, the operating device 10 will now be discussed in more detail. The operating device 10 basically comprises a base 18. The operating device 10 further comprises an electric operating unit 20. The electric operating unit 20 is provided to the base 18. The base 18 is configured to mount the operating device 10 to a handlebar H of the human-powered vehicle V. More specifically, in the illustrated embodiment, the operating device 10 further comprises a handlebar clamp 22 coupled to the base 18. The handlebar clamp 22 is configured to be detachable and attachable with respect to the base 18. Here, the handlebar clamp 22 is a part of an additional operating device 24, which is a hydraulic brake operating device in the illustrated embodiment.

Since the additional operating device 24 has relatively conventional functions in the bicycle field, only the handlebar clamp 22 of the additional operating device 24 will only be discussed mentioned herein. The handlebar clamp 22 supports both the operating device 10 and the additional operating device 24 on the handlebar H, which is a bicycle handlebar in the illustrated embodiment. Alternatively, the handlebar clamp 22 can be integrated into the base 18 of the operating device 10. Further, the additional operating device 24 can be omitted from the clamp 22 irrespective of an attachment manner between the base 18 and the clamp 22.

Figure 3:
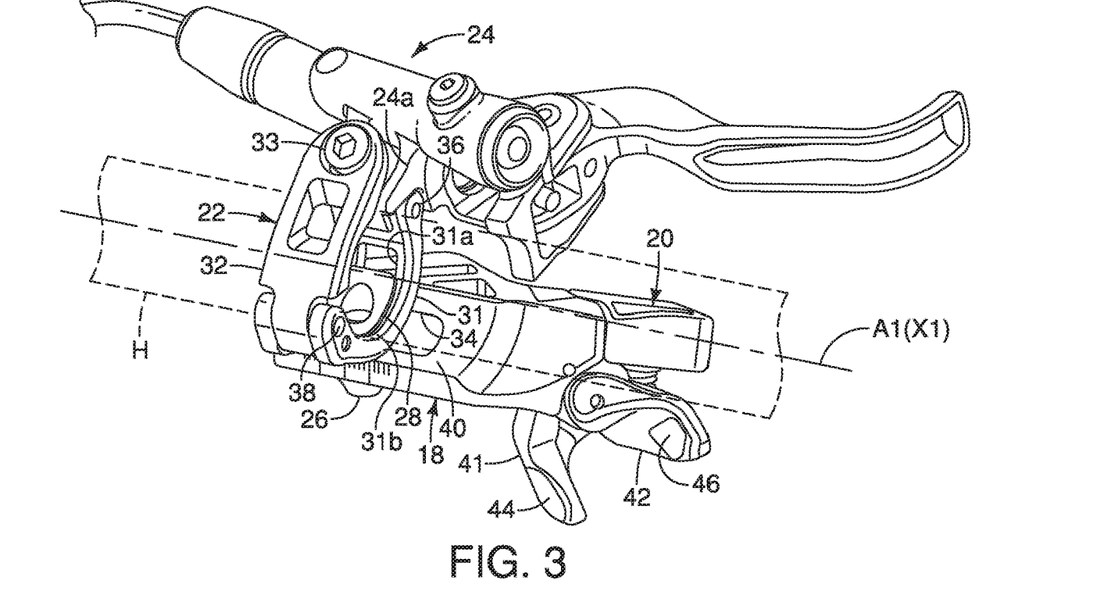
FIG. 3 is a perspective view of a portion of a handlebar that includes the operating device illustrated in FIG. 1 and an additional operating device in the form of a hydraulic brake operating device, in which first and second operating members of the operating device are in an unoperated or rest position.
Figure 7:
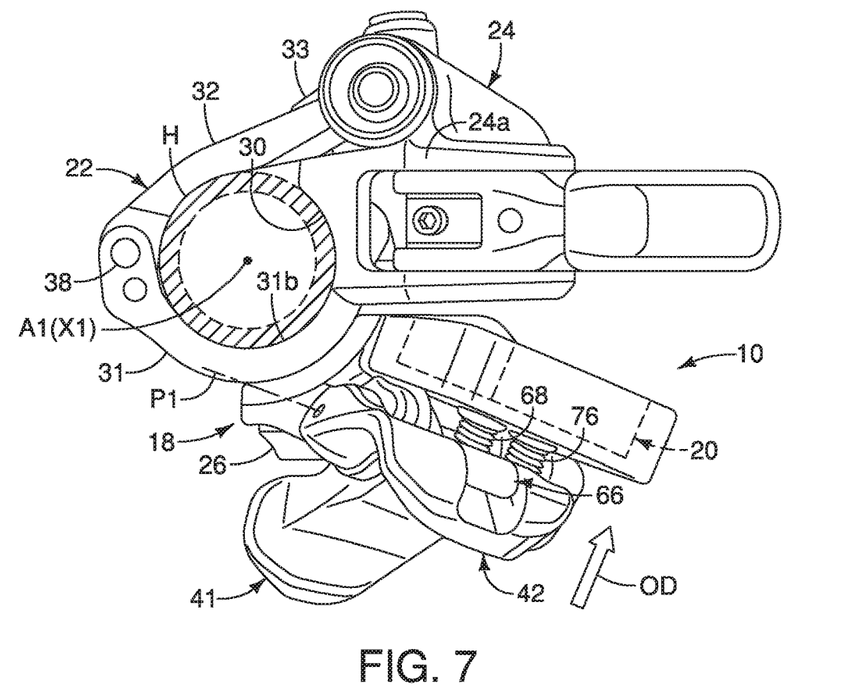
FIG. 7 is a laterally outer end elevational view of the portion of the handlebar that includes the operating device and the additional operating device illustrated in FIGS. 2 to 6.
Figure 8:
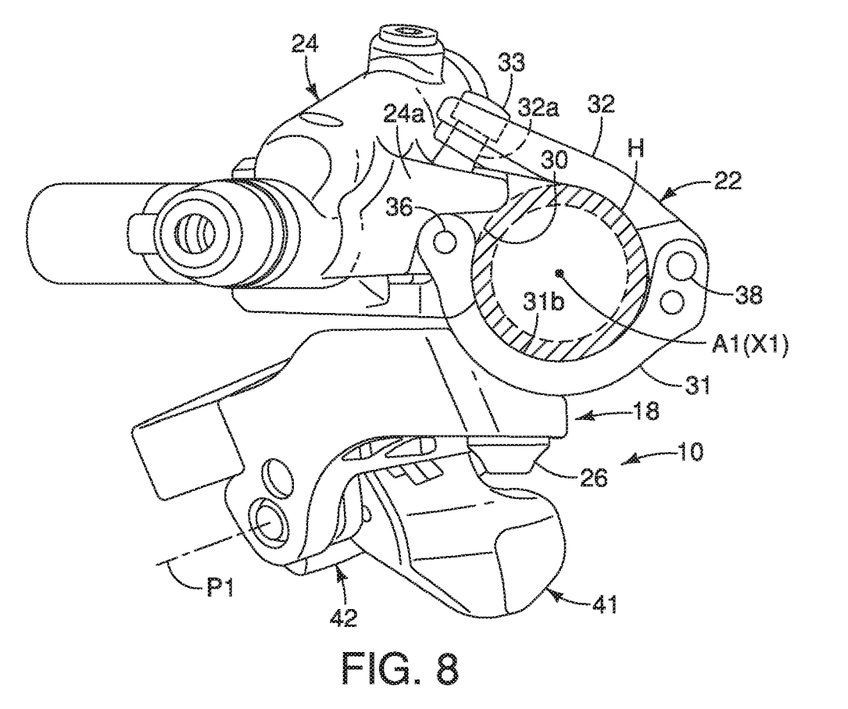
FIG. 8 is a laterally inner end elevational view of the portion of the handlebar that includes the operating device and the additional operating device illustrated in FIGS. 2 to 7.

Here, as seen in FIG. 3, the base 18 is attached to the handlebar clamp 22 by a suitable fastener such as a fixing bolt 26 and a fixing nut 28. In the illustrated embodiment, as seen in FIGS. 7 and 8, the handlebar clamp 22 includes a contact portion 30, a first clamp part 31, a second clamp part 32 and a fixing fastener 33. As seen in FIG. 3, the first clamp part 31 has an opening 31a for receiving the fixing nut 28, while the base 18 has an opening 34 for receiving the fixing bolt 26. In this way, the base 18 is detachable and attachable to the first clamp part 31 of the handlebar clamp 22.

In the illustrated embodiment, as seen in FIG. 7, the contact portion 30 is provided on a base 24a of the additional operating device 24, and configured to contact the handlebar H in an attached state in which the handlebar clamp 22 is attached to the handlebar H. The first clamp part 31 is hingedly connected to the contact portion 30 (FIG. 3). The second clamp part 32 is hingedly connected to the first clamp part 31. Thus, the first clamp part 31 has a first end hingedly connected to the base 18 by a pivot pin 36, and a second end hingedly connected the second clamp part 32 by a pivot pin 38. The second clamp part 32 has a first end with an opening 32a (FIG. 8) for receiving the fixing fastener 33, and a second end hingedly connected the first clamp part 31 by the pivot pin 38. The fixing fastener 33 is threadedly coupled to the contact portion 30 of the base 24a of the additional operating device 24. The handlebar clamp 22 defines a handlebar receiving area that has a center fixing axis X1. The center fixing axis X1 coincides with a center axis of the handlebar H in the attached state.

Referring to FIG. 3, the base 18 defines a mounting axis A1. Preferably, the base 18 has a curved mounting surface 40 that contacts a corresponding curved portion 31b of the first clamp part 31. The curved portion 31b of the first clamp part 31 has a center of curvature that substantially corresponds to the center fixing axis X1 of the handlebar clamp 22. Thus, the curved mounting surface 40 defines the mounting axis A1, which coincides with the center fixing axis X1 of the handlebar clamp 22. Alternatively, the mounting axis A1 of the operating device 10 can be offset from the center fixing axis X1 of the handlebar clamp 22. Also, the opening 31a extends through the curved portion 31b of the first clamp part 31, and is elongated in the circumferential direction around the center fixing axis X1 of the handlebar clamp 22. In this way, the operating device 10 can be adjusted relative to the handlebar clamp 22 about the mounting axis A1.

The operating device 10 further comprises a first operating member 41. Preferably, the operating device 10 further comprises a second operating member 42. The second operating member 42 is a separate member from the first operating member 41. In other words, the first operating member 41 and the second operating member 42 can be operated independently of each other. Also, depending on how the operating device 10 is to be used, the second operating member 42 can be omitted as needed and/or desired. The first operating member 41 can be used to operate one of the electric operated devices, while the second operating member 42 can be used to operate another electric operated device. Alternatively, the first operating member 41 and the second operating member 42 can be used to the same electric operated device.

Figure 4:
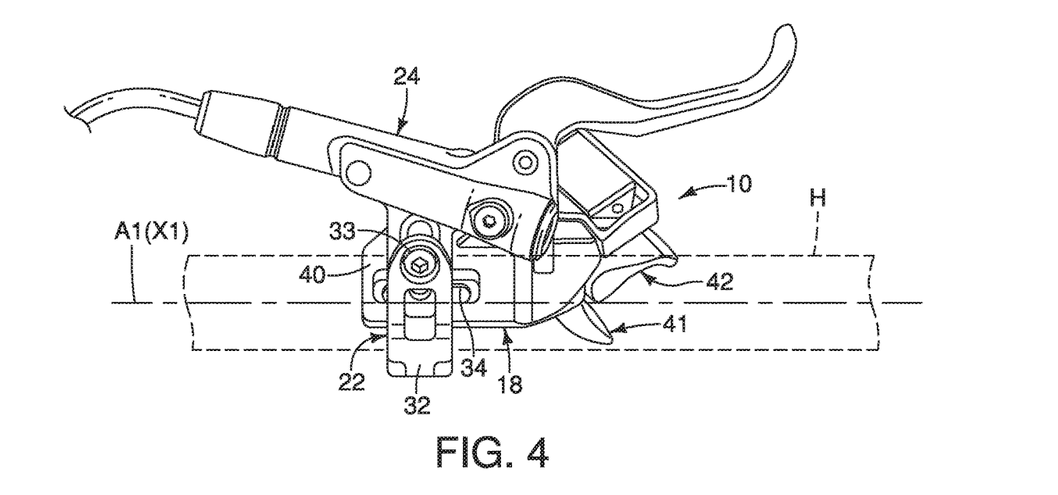
FIG. 4 is a top view of the portion of the handlebar that includes the operating device and the additional operating device illustrated in FIGS. 2 and 3.
Figure 5:
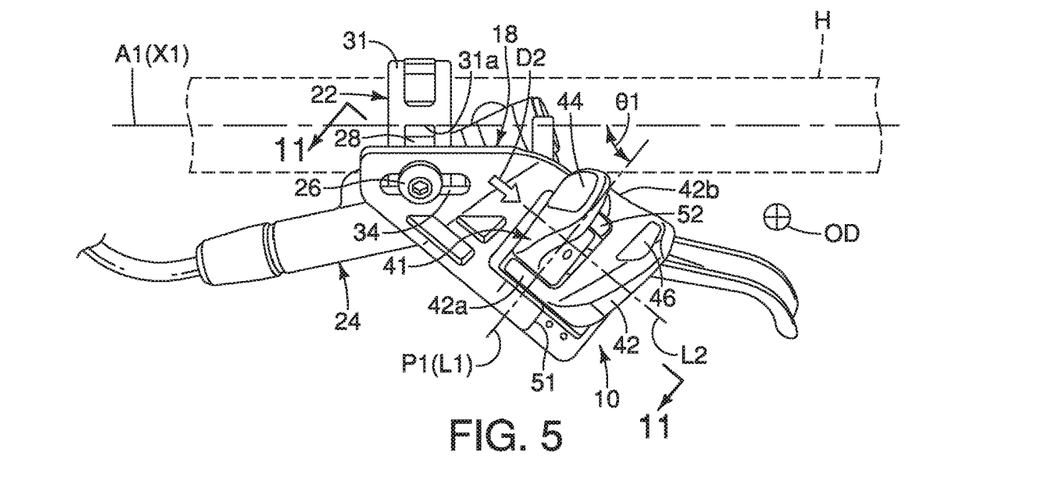
FIG. 5 is a bottom view of the portion of the handlebar that includes the operating device and the additional operating device illustrated in FIGS. 2 to 4.
Figure 6:
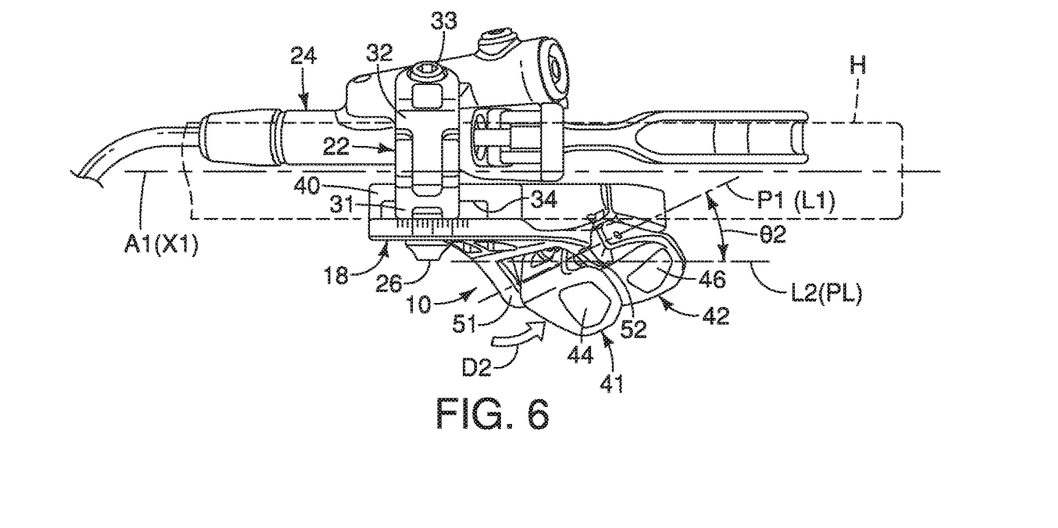
FIG. 6 is a rear side elevational view of the portion of the handlebar that includes the operating device and the additional operating device illustrated in FIGS. 2 to 5.
Figure 11:
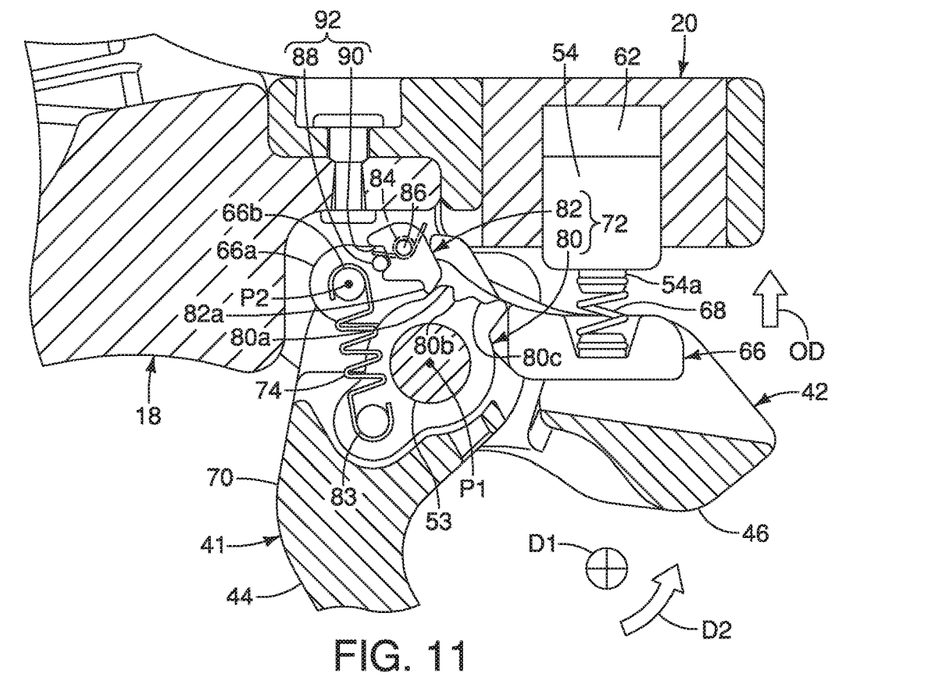
FIG. 11 is a partial cross sectional view of the operating device illustrated in FIGS. 2 to 9 taken along a section line 11-11 of FIG. 5, in which the first operating member and the second operating member of the operating device are in first positions corresponding to the unoperated or rest positions.

Preferably, as seen in FIGS. 4 and 5, the first operating member 41 has a first user interface 44. The first user interface 44 is the portion of the first operating member 41 that is designed to be used by a user to operate the first operating member 41. The first user interface 44 faces an operating orientation with respect to the pivot axis P1. As seen in FIG. 11, the pivot axis P1 is arranged between the first user interface 44 and the mounting axis A1 as seen in a pivot axis direction D1 (indicated by the symbol "⊗" in FIGS. 11 to 18) that is parallel to the pivot axis P1. Likewise, the second operating member 42 has a second user interface 46. The second user interface 46 is the portion of the second operating member 42 that is designed to be used by a user to operate the second operating member 42. The second user interface 46 faces the operating orientation with respect to the pivot axis P1. Thus, the first user interface 44 and the second user interface 46 are oriented to a same direction with respect to the pivot axis P1. As seen in FIGS. 5 and 11, the pivot axis P1 is arranged between the second user interface 46 and the mounting axis A1 as seen in the pivot axis direction D1. As seen in FIG. 3, the second user interface 46 is at least partly offset from the first user interface 44 as seen in the pivot axis direction D1. As seen in FIGS. 5 and 11, the second user interface 46 at least partly overlaps the first user interface 44 as seen in a pivotal movement direction D2 of the first operating member 41 and the second operating member 42 about the pivot axis P1.

Here, the electric operating unit 20 is configured to be activated in response to a pivotal movement of the first operating member 41. The first operating member 41 is movably arranged with respect to the base 18 from a first position to a second position. Here, in the illustrated embodiment, the first position of the first operating member 41 corresponds to an unoperated position of the first operating member 41, while the second position corresponds to an operated position of the first operating member 41. The first operating member 41 is moved in from the first (unoperated) position towards the second position to activate the electric operating unit 20 as discussed later.

Also, the electric operating unit 20 is configured to be activated in response to a pivotal movement of the second operating member 42. In other words, the second operating member 42 is also movably arranged with respect to the base 18 from a first (unoperated) position to a second (operated) position. Thus, in the illustrated embodiment, the first operating member 41 and the second operating member 42 are pivotally mounted to the base 18. Namely, the first operating member 41 is pivotally arranged with respect to the base 18 around the pivot axis P1. The pivot axis P1 constitutes a first pivot axis. Here, the first operating member 41 and the second operating member 42 are coaxially mounted to the base 18. Thus, the second operating member 42 is pivotally arranged with respect to the base 18 around the pivot axis P1.

More specifically, the base 18 includes a first pivot support 51 and a second pivot support 52 that is axially spaced from the first pivot support 51 along the pivot axis P1. As seen in FIGS. 7 and 8, the pivot axis P1 obliquely extends with respect to the mounting axis A1. In other words, the pivot axis P1 and the mounting axis A1 do not lying in a single plane. The first operating member 41 is pivotally mounted to the first pivot support 51 and the second pivot support 52. Likewise, the second operating member 42 is pivotally mounted to the first pivot support 51 and the second pivot support 52. With this arrangement, as seen in FIGS. 4 and 5, namely in the top and bottom views, the first operating member 41 is arranged closer to the mounting axis A1 than the electric operating unit 20. Likewise, preferably, in the top and bottom views, the second operating member 42 is arranged closer to the mounting axis A1 than the electric operating unit 20.

Here, in the illustrated embodiment, the operating device 10 further comprises a pivot pin 53 (FIG. 8) coupled between the first pivot support 51 and the second pivot support 52. The pivot pin 53 defines the pivot axis P1. The first operating member 41 is pivotally supported on the pivot pin 53 between the first pivot support 51 and the second pivot support 52. Likewise, the second operating member 42 is pivotally supported on the pivot pin 53 between the first pivot support 51 and the second pivot support 52. In particular, as seen in FIG. 5, the second operating member 42 has a first portion 42a and a second portion 42b. The first portion 42a is pivotally supported on the pivot pin 53 between the first pivot support 51 and the second pivot support 52. The second portion 42b is pivotally supported on the pivot pin 53 on a side of one of the first pivot support 51 and the second pivot support 52 that faces away from the other of the first pivot support 51 and the second pivot support 52. In this way, the second operating member 42 straddles the first operating member 41 on the pivot pin 53.

In the illustrated embodiment, as seen in FIG. 11, the electric operating unit 20 of the operating device 10 further comprises a first electric switch 54. The first electric switch 54 includes a movable part 54a that is depressed in response to the pivotal movement of the first operating member 41. The movable part 54a moves in an operation direction OD when depressed (indicated by the symbol "⊗" in FIG. 5). In this way, the electric operating unit 20 includes the movable part 54a that is configured to be moved in the operation direction OD in response to the pivotal movement of the first operating member 41.

Figure 12:
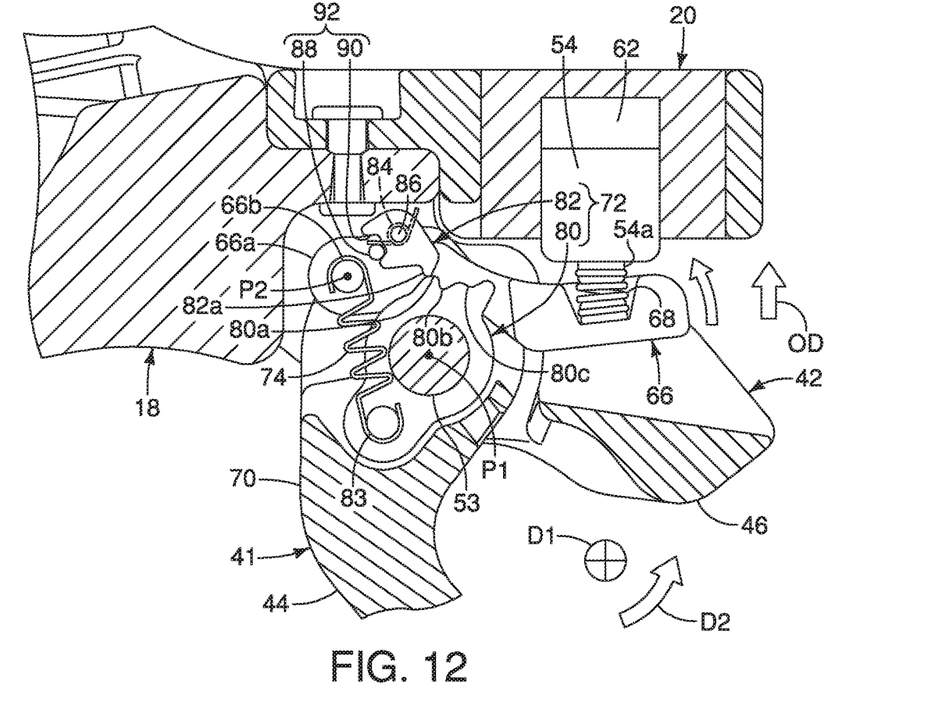
FIG. 12 is a partial cross sectional view, similar to FIG. 11, of the operating device illustrated in FIGS. 2 to 9 but in which the first operating member has been moved by a user from the first position to the intermediate position such that an output part is moved to activate the first switch.

The first electric switch 54 is activated and generates electricity upon activation in response to a pivotal movement of the first operating member 41. The first electric switch 54 is provided to the base 18. As illustrated in FIGS. 11 to 15, the first operating member 41 is configured to activate the first electric switch 54 at least two distinct times in response to a progressive movement of the first operating member 41 from the first position towards the second position. Moreover, as illustrated in FIGS. 11 and 12, the first operating member 41 is further configured to activate the first electric switch 54 only once in response to the progressive movement of the first operating member 41 from the first position towards an intermediate position that is along a travel path of the first operating member 41 between the first position and the second position.

Figure 18:
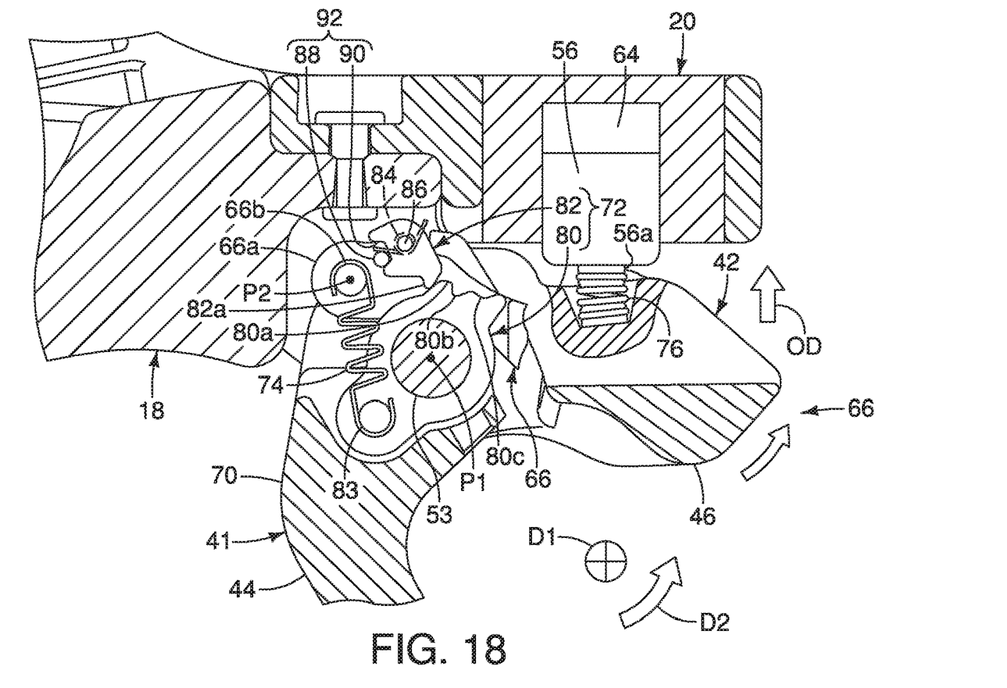
FIG. 18 is a partial cross sectional view, similar to FIGS. 11 to 17, of the operating device illustrated in FIGS. 2 to 9 but in which the second operating member has been moved by a user from the first position to the second position such that the second switch is activated.

As seen in FIG. 18, the electric operating unit 20 further includes a second electric switch 56. The second electric switch 56 is aligned with the first electric switch 54 along the pivot axis P1. The second electric switch 56 includes a movable part 56a that is depressed in response to the pivotal movement of the second operating member 42. The movable part 56a moves in the operation direction OD when depressed. In this way, the electric operating unit 20 includes the movable part 56a that is configured to be moved in the operation direction OD in response to the pivotal movement of the second operating member 42. The second electric switch 56 is activated and generates electricity upon activation in response to a pivotal movement the second operating member 42. The second operating member 42 is movably arranged with respect to the base 18. As mentioned above, the second operating member 42 is a separate member from the first operating member 41. The second electric switch 56 is activated in response to a progressive movement of the second operating member 42. Here, the second operating member 42 is configured to be free from activating the first electric switch 54 in response to the progressive movement of the second operating member 42.

As mentioned above, the pivot axis P1 of the first operating member 41 and the second operating member 42 obliquely extends with respect to the mounting axis A1 of the base 18. The orientation of the pivot axis P1 can be determined from FIGS. 5 and 6. In particular, the pivot axis P1 is determined by manipulating a first imaginary line L1 with respect to a second imaginary line L2 and an imaginary plane PL (see FIG. 6). More specifically, the first imaginary line L1 lies in an imaginary plane PL parallel to the mounting axis A1 and defines a first angle θ1 between the mounting axis A1 and the first imaginary line PL as seen in a direction perpendicular to the imaginary plane PL containing the first imaginary line L1. In this way, the first angle θ1 of the pivot axis P1 is determined. Then, first imaginary line L1 is rotated to a rotational angle θ2 about a second imaginary line L2 that is lies perpendicular to the first imaginary line L1 in the imaginary plane PL such that the first imaginary line L1 is set as the pivot axis P1. The direction rotational angle θ2 is such that the first operating member 41 and the second operating member 42 are inclined up (pivoted) toward a face of a rider. The first angle θ1 is in a range from 5 degrees to 85 degrees. Preferably, the first angle θ1 is in a range from 30 degrees to 70 degrees. The rotational angle θ2 is in a range from plus 50 degrees to minus 50 degrees from the imaginary plane PL. Preferably, the second angle θ2 is in a range from plus 30 degrees to minus 20 degrees. Here, "plus" means rotating toward a rearward and upward direction from the imaginary plane PL, and "minus" means rotating toward frontward and upward direction from the imaginary plane PL. Here in the illustrated embodiment, the first angle θ1 is 60 degrees and the rotational angle θ2 is plus 20 from the imaginary plane PL.

The operating device 10 further comprises a wireless communicator 60 that is coupled to the first electric switch 54. The wireless communicator 60 is also coupled to the second electric switch 56. Here, the electric operating unit 20 includes the wireless communicator 60 (FIG. 2). Alternatively, it will be apparent from this disclosure that the wireless communicator 60 can be remotely located from the electric operating unit 20 as needed and/or desired. The wireless communicator 60 is configured to output wireless control signals from the first electric switch 54 and the second electric switch 56 to the wireless communicator 16 of the control unit CU for operating a component of the human-powered vehicle V. Alternatively, it will be apparent from this disclosure that the first electric switch 54 and the second electric switch 56 can communicate with the control unit CU or some other component using an electrical wire.

Preferably, the operating device 10 further includes a power source for providing electrical power to the first electric switch 54, the second electric switch 56 and the wireless communicator 60. Here, in the illustrated embodiment, as seen in FIGS. 2 and 11, the operating device 10 further comprises a first electricity-generating element 62 that coupled to the first electric switch 54 to generate electricity upon activation of the first electric switch 54. In the illustrated embodiment, the first electricity-generating element 62 is a piezoelectric element provided in the first electric switch 54 such that the first electricity generating element 62 generates electricity in response movement of the movable part 54a in the operation direction OD. Also, preferably, as seen in FIGS. 2 and 18, the operating device 10 further comprises a second electricity-generating element 64 that is coupled to the second electric switch 56 to generate electricity upon activation of the second electric switch 56. In the illustrated embodiment, the second electricity-generating element 64 is a piezoelectric element provided in the second electric switch 56 such that the second electricity generating element 64 generates electricity in response movement of the movable part 56a in the operation direction OD. In this way, the first electricity-generating element 62 provides electricity to the first electric switch 54 and the wireless communicator 60 upon activation of the first electric switch 54. On the other hand, the second electricity-generating element 64 provides electricity to the second electric switch 56 and the wireless communicator 60 upon activation of the second electric switch 56. Alternatively, the operating device 10 can be provided with some other suitable power source such as a rechargeable battery or a replaceable battery.

Figure 9:
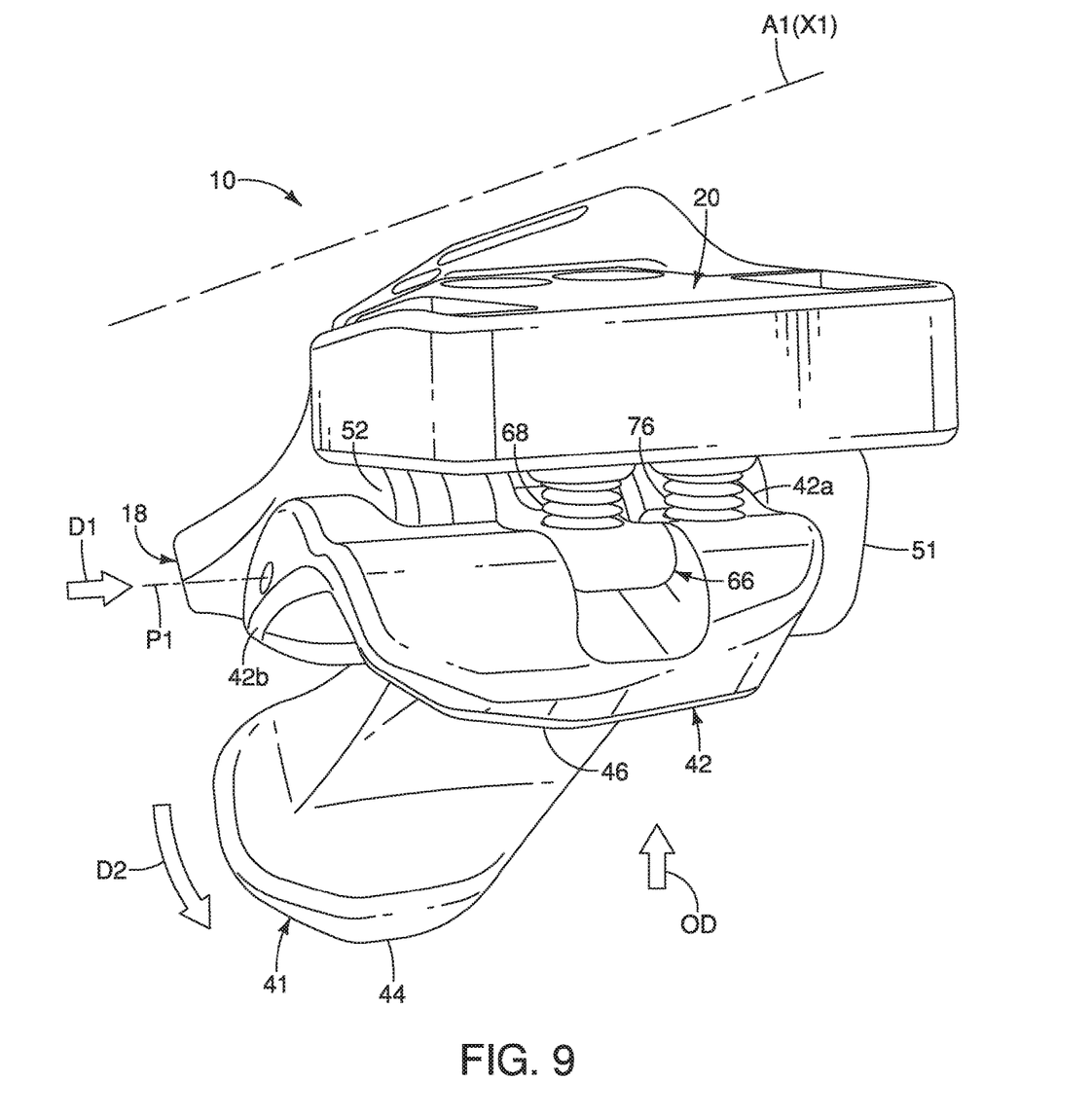
FIG. 9 is a perspective view of the operating device illustrated in FIGS. 2 to 8.
Figure 10:
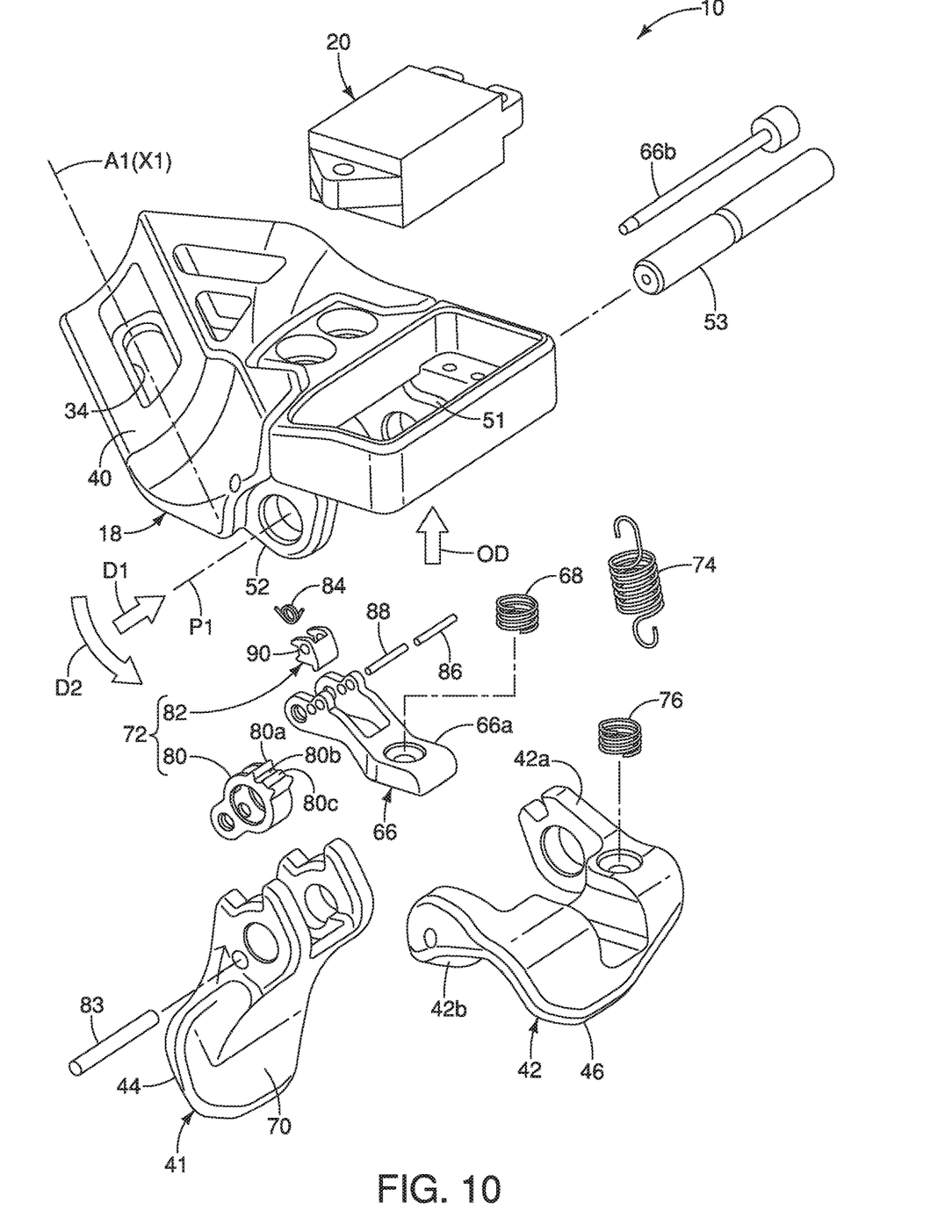
FIG. 10 is an exploded perspective view of the operating device illustrated in FIGS. 2 to 9.

In the illustrated embodiment, as seen in FIGS. 9 to 11, the operating device 10 further comprises an output part 66 movably coupled to the base 18. In particular, the output part 66 is configured to pivot in response to a pivotal movement of the first operating member 41. In particular, the output part 66 is moved by the first operating member 41 to activate the first electric switch 54. The output part 66 either activates the first electric switch 54 once if the first operating member 41 is only partially operated or activates the first electric switch 54 twice if the first operating member 41 is fully operated. The output part 66 includes a rocker 66a and a pivot pin 66b. The rocker 66a is pivotally arranged with respect to the base 18 around a second pivot axis P2 that is offset from the first pivot axis P1. The second pivot axis P2 is defined by the pivot pin 66b. The second pivot axis P2 is parallel to the first pivot axis P1. Here, the rocker 66a is pivotally mounted on the base 18 by the pivot pin 66b. The output part 66 is biased away from the first electric switch 54. In particular, a biasing element 68 is provided between the first electric switch 54 and the rocker 66a of the output part 66. The biasing element 68 is a coiled compression spring and applies an urging force on the rocker 66a of the output part 66 to bias the output part 66 away from the first electric switch 54.

Here, as seen in FIGS. 10 and 11, the first operating member 41 includes a first operating body 70 and a reciprocating mechanism 72. The first operating body 70 is pivotally arranged with respect to the base 18 around the pivot axis P1 (i.e., a first pivot axis). In particular, the first operating body 70 is pivotally arranged with respect to the base 18 around the pivot axis P1 from the first position towards the second position to activate the electric operating unit 20. The movement of the first operating body 70 is transmitted to the output part 66 by the reciprocating mechanism 72. In particular, the reciprocating mechanism 72 connects the first operating body 70 to the output part 66 such that the output part 66 is repeatedly moved in response to the progressive movement of the first operating member 41 from the first position towards the second position.

In the illustrated embodiment, the electric operating unit 20 is activated twice as the first operating body 70 moves in a progressive movement from the first position towards the second position. As used herein, the term "progressive movement" means moving in one direction along an operation path without reversing direction, and includes both continuous movement along the operation path and intermittent movement along the operation path. Also, while the electric operating unit 20 is only activated twice as the first operating body 70 moves in a progressive movement from the first position towards the second position in the illustrated embodiment, the operating device 10 is not limited to this arrangement. Rather, it will be apparent from this disclosure that the first operating member 41 can be configured to activate, the electric operating unit 20 more than two times in a progressive movement from the first position towards the second position.

The first operating member 41 is biased away from the first electric switch 54 towards the first position. In particular, the operating device 10 further comprises a biasing element 74 that applies an urging force on the first operating member 41 to bias the first operating member 41 away from the first electric switch 54. Here, the biasing element 74 is a coiled tension spring having a first end hooked on the pivot pin 66b and a second end hooked on the first operating body 70. In this way, the first operating body 70 is urged to the first position. In the first position, the first operating body 70 is urged against the pivot pin 66b by the biasing element 74 such that the first operating body 70 remains stationary until operated by a user.

Similarly, as seen in FIGS. 9 and 10, the second operating member 42 is biased away from the second electric switch 56. In particular, the operating device 10 further comprises a biasing element 76 that applies an urging force on the second operating member 42 to bias the second operating member 42 away from the second electric switch 56. Here, the biasing element 76 is a coiled compression spring that is positioned between the second operating member 42 and the second electric switch 56. In this way, the second operating member 42 is urged to the first position. In the first position, the second operating member 42 is urged against the pivot pin 66b by the biasing element 76 such that the second operating member 42 remains stationary until operated by a user. In the illustrated embodiment, the first portion 42a of the second operating member 42 has a recess 42c in which the pivot pin 66b of the rocker 66a is arranged.

As seen in FIGS. 10 and 11, the reciprocating mechanism 72 includes a cam 80 provided to the first operating body 70, and a follower 82 provided to the output part 66. In particular, the cam 80 is non-movably provided to the first operating body 70. Here, the cam 80 is non-movably attached to the first operating body 70 by the pivot pin 53 and a fixing pin 83. On the other hand, the follower 82 is pivotally provided on the output part 66. The cam 80 contacts and moves the follower 82 to move the output part 66 such that the output part 66 activates the first electric switch 54 in response to the progressive movement of the first operating member 41 from the first position towards the second position.

At least one of the cam 80 and the follower 82 is biased to the other of the cam 80 and the follower 82 so as to be in contact with the one another. Here, a biasing element 84 is provided for urging the follower 82 in contact with the cam 80. In particular, the follower 82 pivotally mounted on the rocker 66a by a pivot pin 86. The biasing element 84 is a torsion spring having its coiled portion provided on the pivot pin 86, a first free end engaged with a pin 88 of the rocker 66a, and a second free end engaged with the follower 82. In this way, the follower 82 is in contact with the cam 80 by the biasing element 84. The pin 88 also acts as an abutment that is disposed in a recess 90 of the follower 82 to limit a pivotal movement range of the follower 82 around the pivot pin 86. In other words, the first operating member 41 further includes a limiting structure 92 (e.g., the pin 88 and the recess 90) that is configured to limit a pivotal movement range of the follower 82 with respect to the output part 66. Generally, the limiting structure 92 includes a protrusion (e.g., the pin 88) provided to one of the output part 66 and the follower 82, and a recess (e.g., the recess 90) provided to the other of the output part 66 and the follower 82. Here, in the illustrated embodiment, the protrusion corresponds to the pin 88 that is provided to output part 66, and the recess corresponds to the recess 90 that is provided to the follower 82.

As seen in FIGS. 11 to 17, the follower 82 has an abutment 82a that rides along the peripheral edge of the cam 80 as the cam moves with the first operating body 70 in response to operation of the first operating member 41. On the other hand, the peripheral edge of the cam 80 includes a first ridge 80a, a first valley 80b and a second ridge 80c. During operation of the first operating member 41 in the pivotal movement direction D2, the cam 80 is rotated with the first operating body 70, which causes the abutment 82a of the follower 82 to first engage the first ridge 80a of the cam 80. The engagement of the abutment 82a of the follower 82 with the first ridge 80a of the cam 80 causes the rocker 66a to pivot towards the first electric switch 54 such that the first electric switch 54 is depressed (i.e., activated) in the operation direction OD. Then further progressive movement of the first operating member 41 in the pivotal movement direction D2 causes the abutment 82a of the follower 82 to then engage the first valley 80b of the cam 80. The engagement of the abutment 82a of the follower 82 with the first valley 80b of the cam 80 causes the rocker 66a to pivot away from the first electric switch 54 such that the first electric switch 54 is released (i.e., deactivated).

Then further progressive movement of the first operating member 41 in the causes the abutment 82a of the follower 82 to then engage the second ridge 80c of the cam 80. The engagement of the abutment 82a of the follower 82 with the second ridge 80c of the cam 80 causes the rocker 66a to again pivot towards the first electric switch 54 such that the first electric switch 54 is depressed (i.e., activated) in the operation direction OD for a second time.

Figure 13:
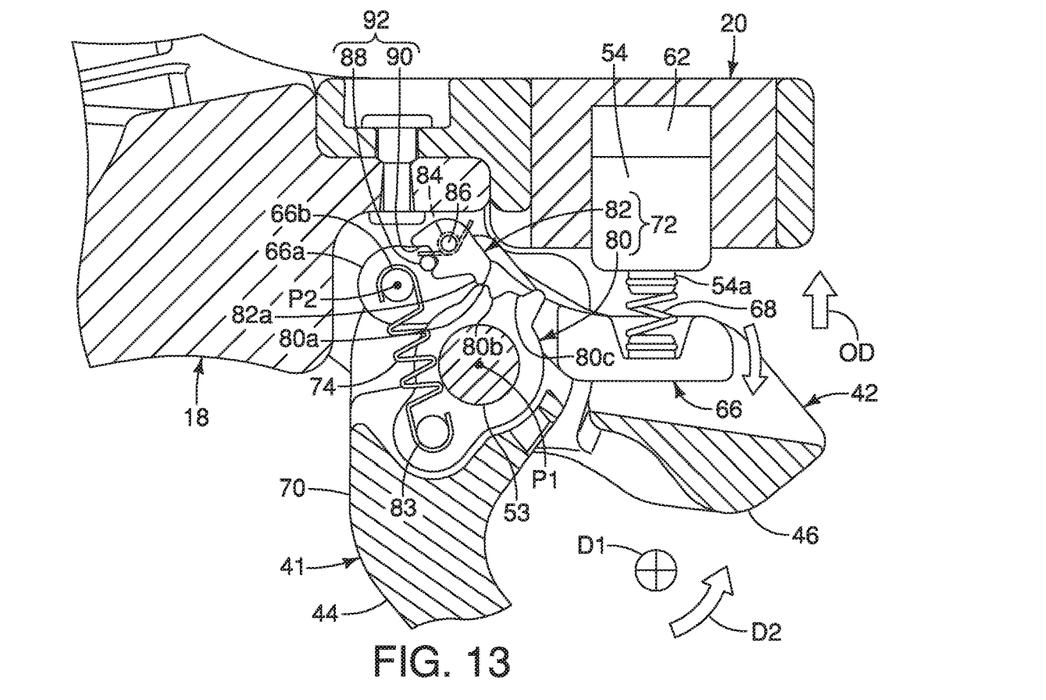
FIG. 13 is a partial cross sectional view, similar to FIGS. 11 and 12, of the operating device illustrated in FIGS. 2 to 9 but in which the first operating member is moved farther by a user from the intermediate position in FIG. 12 such that the output part starts returning to its unoperated or rest position.
Figure 14:
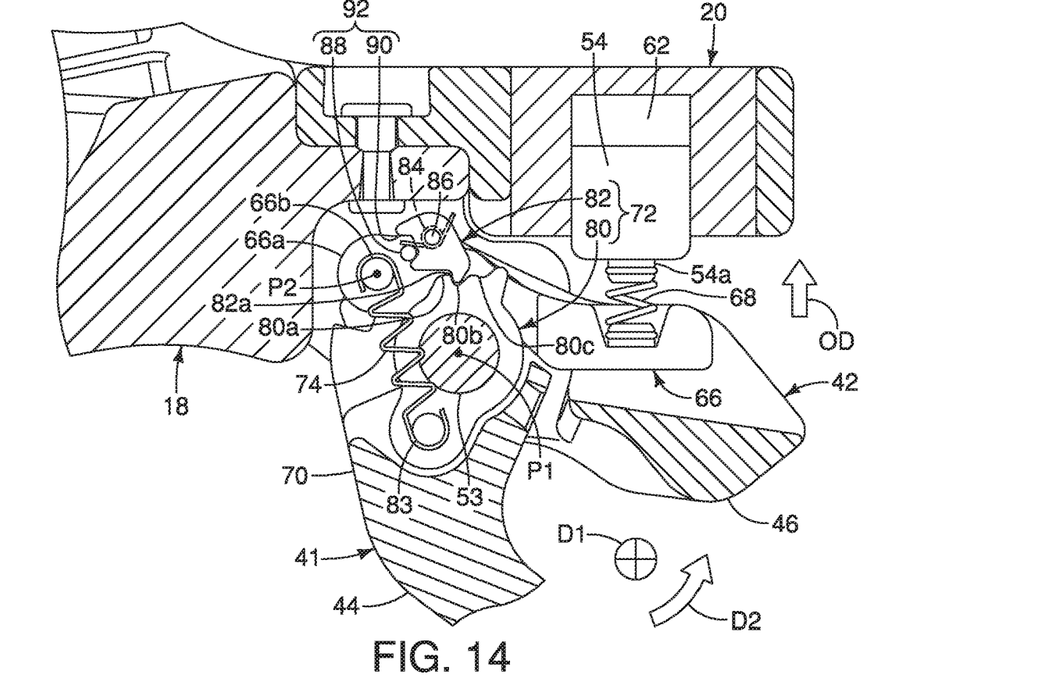
FIG. 14 is a partial cross sectional view, similar to FIGS. 11 to 13, of the operating device illustrated in FIGS. 2 to 9 but in which the first operating member is moved farther by a user from the position in FIG. 13 such that the output part returns to its unoperated or rest position.
Figure 15:
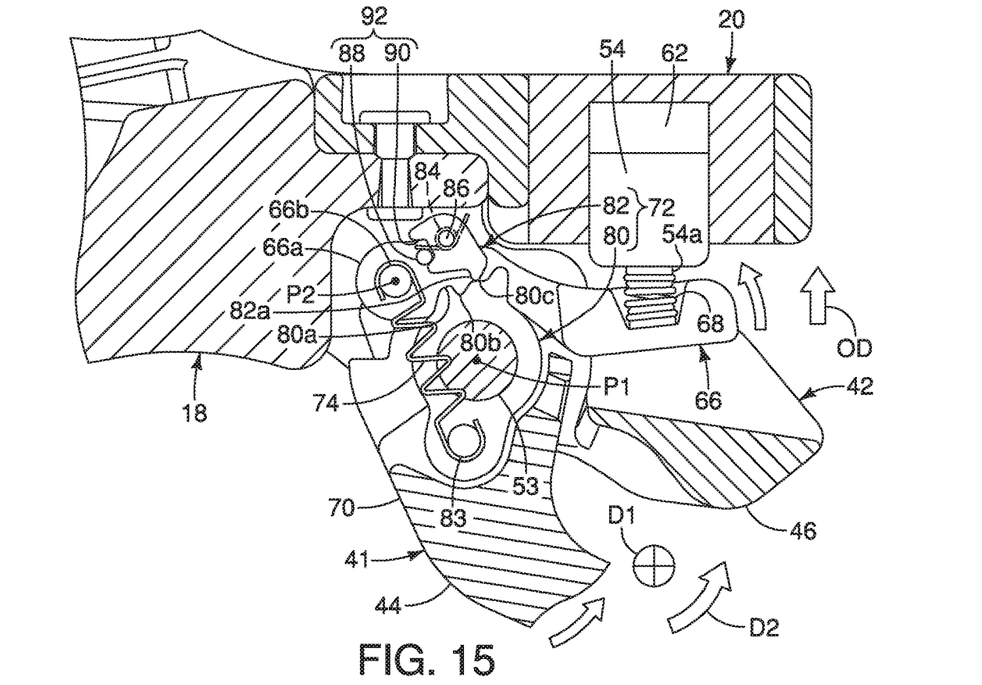
FIG. 15 is a partial cross sectional view, similar to FIGS. 11 to 14, of the operating device illustrated in FIGS. 2 to 9 but in which the first operating member has been moved farther by a user from the position in FIG. 14 to a second position such that the first switch is activated by the output part for a second time in response to the progressive movement of the first operating member from the first position of FIG. 11 to the second position.

FIGS. 11 to 18 illustrate the first operating member 41 of the operating device 10 being operated by a user to active the electric operating unit 20 twice as the first operating body 70 moves in a progressive movement from the first position (FIG. 11) towards the second position (FIG. 15). As seen in FIG. 11, the first operating body 70 of the first operating member 41 has been moved by the user from the first position (FIG. 11) to the intermediate position such that the rocker 66a of the output part 66 is moved to activate the first electric switch 54. More specifically, the cam 80 is rotated with the first operating body 70, which causes the abutment 82a of the follower 82 to engage the first ridge 80a of the cam 80. The engagement of the abutment 82a of the follower 82 with the first ridge 80a of the cam 80 causes the rocker 66a of the output part 66 to pivot towards the first electric switch 54 such that the first electric switch 54 is depressed (i.e., activated). If the user only wants one activation of the first electric switch 54, then the user merely releases the first operating body 70 of the first operating member 41 and the first operating body 70 of the first operating member 41 returns to the first position (FIG. 11). On the other hand, if the user wants two activations of the first electric switch 54, then the user continues to move the first operating body 70 of the first operating member 41 in the pivotal movement direction D2 without moving first operating body 70 of the first operating member 41 in the opposite direction to the pivotal movement direction D2 as seen in FIGS. 13 and 14.

Referring to FIGS. 13 and 14, the first operating body 70 of the first operating member 41 has been moved farther by the user from the intermediate position in FIG. 12 such that the rocker 66a of the output part 66 starts returning to its unoperated or rest position. In particular, further progressive movement of the first operating body 70 of the first operating member 41 causes the abutment 82a of the follower 82 to engage the first valley 80b of the cam 80. The engagement of the abutment 82a of the follower 82 with the first valley 80b of the cam 80 causes the rocker 66a of the output part 66 to pivot away from the first electric switch 54 such that the first electric switch 54 is released (i.e., deactivated).

As seen in FIG. 15, the first operating body 70 of the first operating member 41 is moved farther by the user from the position in FIG. 14 to the second position such that the rocker 66a of the output part 66 moves towards the first electric switch 54. In particular, this further progressive movement of the first operating body 70 of the first operating member 41 in the pivotal movement direction D2 causes the abutment 82a of the follower 82 to then engage the second ridge 80c of the cam 80. The engagement of the abutment 82a of the follower 82 with the second ridge 80c of the cam 80 causes the rocker 66a to again pivot towards the first electric switch 54 such that the first electric switch 54 is depressed (i.e., activated) for a second time.

Figure 16:
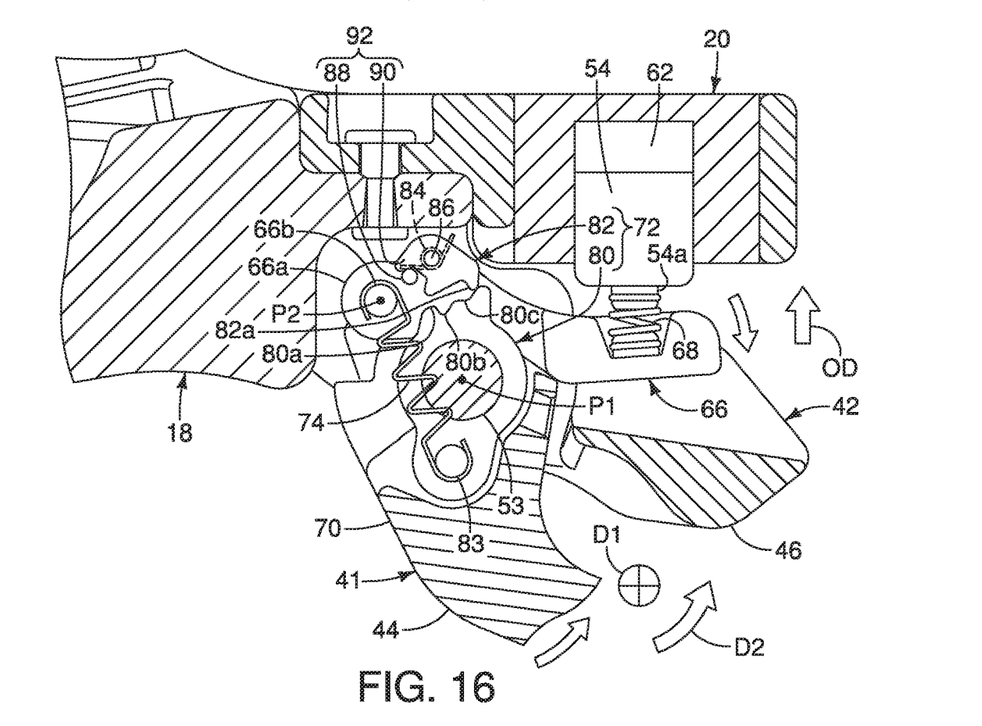
FIG. 16 is a partial cross sectional view, similar to FIGS. 11 to 15, of the operating device illustrated in FIGS. 2 to 9 but in which the first operating member has been moved slightly farther by a user from the second position in FIG. 15 to a position past the second position such that the follower can now be rotated by the output part to deactivate the first switch.
Figure 17:
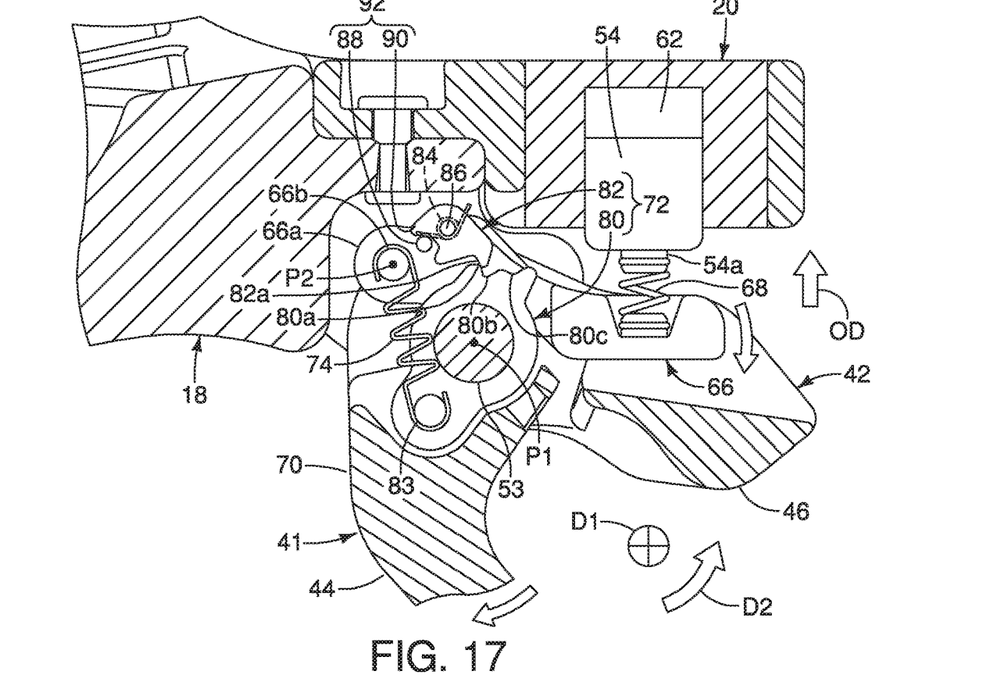
FIG. 17 is a partial cross sectional view, similar to FIGS. 11 to 16, of the operating device illustrated in FIGS. 2 to 9 but in which the first operating member is returning towards the unoperated or rest position after the first switch has been activated twice by a progressive movement of the first operating member from the first position of FIG. 11 to the second position of FIG. 15.

As seen in FIG. 16, the first operating body 70 of the first operating member 41 is moved slightly farther by the user from the position in FIG. 15 to a position past the second position of FIG. 15 such that the follower 82 can now be rotated by the output part 66 to deactivate the first electric switch 54. FIG. 17 shows the first operating member 41 returning towards the first position (FIG. 11) after the first electric switch 54 has been activated twice by a progressive movement of the first operating member 41 from the first position of FIG. 11 to the second position of FIG. 15.

Referring to FIG. 18, operation of the second operating member 42 is illustrated to activate the second electric switch 56 without activating the first electric switch 54. Here, the second operating member 42 is pivoted by a user from the first position (FIG. 11) towards the second position (FIG. 18) such that the second electric switch 56 is activated.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the operating device. Accordingly, these directional terms, as utilized to describe the operating device should be interpreted relative to a human-powered vehicle field (e.g., bicycle) in an upright riding position on a horizontal surface and that is equipped with the operating device. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating device for a human-powered vehicle, the operating device comprising:
    a base;
    a first operating member movably arranged with respect to the base from a first position to a second position; and
    a first electric switch provided to the base;
    the first operating member being configured to activate the same first electric switch at least two distinct times in response to a progressive movement of the first operating member from the first position towards the second position, the first electric switch being released between each of the at least two distinct activations during the progressive movement of the first operating member from the first position towards the second position.

2. The operating device according to claim 1, wherein the first operating member is further configured to activate the first electric switch only once in response to the progressive movement of the first operating member from the first position towards an intermediate position that is along a travel path of the first operating member between the first position and the second position.

3. The operating device according to claim 1, further comprising
a first electricity-generating element coupled to the first electric switch to generate electricity upon activation of the first electric switch.

4. The operating device according to claim 1, further comprising
an output part movably coupled to the base, and
the first operating member including a first operating body and a reciprocating mechanism connecting the first operating body to the output part such that the output part is repeatedly moved in response to the progressive movement of the first operating member from the first position towards the second position.

5. The operating device according to claim 4, wherein
the first operating body is pivotally arranged with respect to the base around a first pivot axis, and
the output part includes a rocker pivotally arranged with respect to the base around a second pivot axis that is offset from the first pivot axis.

6. The operating device according to claim 4, wherein
the reciprocating mechanism includes a cam provided to the first operating body, and a follower provided to the output part, and
the cam contacts and moves the follower to move the output part such that the output part activates the first electric switch in response to the progressive movement of the first operating member from the first position towards the second position.

7. The operating device according to claim 4, wherein
a follower is pivotally provided on the output part, and
at least one of the cam and the follower is biased to the other of the cam and the follower so as to be in contact with the one another.

8. The operating device according to claim 4, wherein
a follower is pivotally provided on the output part, and
the first operating member includes a limiting structure configured to limit a pivotal movement range of the follower with respect to the output part.

9. The operating device according to claim 8, wherein the limiting structure includes
a protrusion provided to one of the output part and the follower, and
a recess provided to the other of the output part and the follower.

10. The operating device according to claim 4, wherein the output part is biased away from the first electric switch.

11. The operating device according to claim 1, further comprising
a second operating member movably arranged with respect to the base, the second operating member being a separate member from the first operating member.

12. The operating device according to claim 11, wherein the second operating member is configured to be free from activating the first electric switch in response to a progressive movement of the second operating member.

13. The operating device according to claim 11, further comprising
a second electric switch activated in response to a progressive movement of the second operating member.

14. The operating device according to claim 13, further comprising
a second electricity-generating element coupled to the second electric switch to generate electricity upon activation of the second electric switch.

15. The operating device according to claim 13, wherein the second operating member is biased away from the second electric switch.

16. The operating device according to claim 11, wherein the first operating member and the second operating member are pivotally mounted to the base.

17. The operating device according to claim 16, wherein the first operating member and the second operating member are coaxially mounted to the base.

18. The operating device according to claim 1, further comprising
a handlebar clamp coupled to the base.

19. The operating device according to claim 18, wherein the handlebar clamp is configured to be detachable and attachable with respect to the base.

20. The operating device according to claim 1, further comprising
a wireless communicator coupled to the first electric switch.

* * * * *